United States Patent
Oh

[19]
[11] Patent Number: 5,982,589
[45] Date of Patent: Nov. 9, 1999

[54] HEAD DRUM ASSEMBLY FOR USE IN A VIDEO CASSETTE RECORDER

[75] Inventor: Se-Woog Oh, Seoul, Rep. of Korea

[73] Assignee: Daewoo Electronics Co., Ltd., Rep. of Korea

[21] Appl. No.: 09/096,345

[22] Filed: Jun. 12, 1998

[30] Foreign Application Priority Data

Jul. 29, 1997 [KR] Rep. of Korea ............... 97-35719

[51] Int. Cl.⁶ ............................................. G11B 5/56
[52] U.S. Cl. ............................................ 360/107
[58] Field of Search ............................ 360/107–109

[56] References Cited

U.S. PATENT DOCUMENTS

| | | | |
|---|---|---|---|
| 5,256,850 | 10/1993 | Maegawa et al. | 219/121.69 |
| 5,303,108 | 4/1994 | Higashionji et al. | 360/107 X |
| 5,341,156 | 8/1994 | Murata et al. | 360/75 |
| 5,347,415 | 9/1994 | Murata et al. | 360/109 |
| 5,450,256 | 9/1995 | Murata et al. | 360/109 X |
| 5,537,276 | 7/1996 | Mukae et al. | 360/109 |

FOREIGN PATENT DOCUMENTS 0488658  6/1992  European Pat. Off. .

Primary Examiner—John H. Wolff
Attorney, Agent, or Firm—Pennie & Edmonds LLP

[57] ABSTRACT

A head drum assembly for use in a video cassette recorder includes a rotary drum having a through hole and a threaded hole, a video head composed of a head chip for recording/reproducing signals on a magnetic tape, and a base plate divided into a fixed portion and a mounting portion for mounting the head chip, wherein the fixed portion of the base plate is formed with an aperture corresponding to the threaded hole of the rotary drum in such a way that the video head is installed on a lower surface of the rotary drum by engaging a fastening screw therethrough, and is formed with a slot, and a deformable member inserted into the slot in such a way that, when the deformable member is impinged by a laser beam, the head chip mounting portion of the base plate moves downwardly by a volume expansion of the deformable member.

9 Claims, 3 Drawing Sheets

HEAD DRUM ASSEMBLY FOR USE IN A VIDEO CASSETTE RECORDER

FIELD OF THE INVENTION

The present invention relates to a head drum assembly for use in a video cassette recorder ("VCR"); and, more particularly, to a head drum assembly capable of adjusting a vertical position of a head chip incorporated therein, precisely and simply.

BACKGROUND OF THE INVENTION

Positioning of a video head is an important factor in determining the quality of the information that can be written on a magnetic tape. Especially, when a plurality of video heads are used for recording, each of the video heads should be positioned at a precise location so as not to adversely influence each other. For example, in a VCR of a video home system (VHS) incorporating therein two video heads, each of the video heads is located in a symmetric position with respect to the central axis of a rotary drum and on the same plane perpendicular to the enteral axis. If any one of the video heads deviates from the plane by some amount, the preceding magnetism pattern is overwritten by the following magnetism pattern, or a large gap is formed between tracks. In both cases, the recorded magnetism pattern is unevenly formed on a videotape, resulting in a degradation of the signals reproduced from the recorded magnetism pattern.

In FIG. 1, there is shown one of the head drum assemblies employing a conventional video head. The head drum assembly 1 includes a rotary drum 3, a video head 5 composed of a head chip 7 and a base plate 9 for mounting the head chip 7 thereon (see FIG. 2) and a stationary drum 11.

The rotary drum 3 is provided with a base plate fixing screw 13 for fixing the base plate 9 to a lower surface thereof and a set screw 15 for adjusting a vertical position of the head chip 7. The rotary drum 3 is fixed to a flange 17 by a rotary drum fixing screw 21. The flange 17 is provided with a rotor transformer 19a fixed by an adhesive or the like on a lower surface thereof and a rotating shaft 23 closely fitted thereinto. On the other hand, a stator transformer 19b is fixed on a top surface of the stationary drum 11 in such a way that a gap is created between the rotor and the stator transformers 19a and 19b.

In assembling the prior art head drum assembly 1, as shown in FIG. 2, the base plate 9 is fastened to the lower surface of the rotary drum 3 through the rotary drum fixing screw 21 so that the outer side of the head chip 7 may protrude beyond past the peripheral surface of the rotary drum 3 by a predetermined length. Then, the set screw 15 is fastened from top of the rotary drum 3 through a threaded hole 25 formed at the rotary drum 3, to thereby adjust the vertical position of the head chip 7.

In such a head drum assembly, however, it is difficult to adjust the vertical position of the head chip precisely, since it is manually adjusted.

SUMMARY OF THE INVENTION

It is, therefore, a primary object of the invention to provide a head drum assembly capable of adjusting a head chip incorporated therein, precisely and simply.

In accordance with one aspect of the present invention, there is provided a head drum assembly for use in a video cassette recorder, comprises a rotary drum having a through hole and a threaded hole which extend from top of the rotary drum to bottom thereof, a video head composed of a head chip for recording/reproducing signals on a magnetic tape, and a base plate divided into a fixed portion and a mounting portion for mounting the head chip, wherein the fixed portion of the base plate is formed with an aperture corresponding to the threaded hole of the rotary drum in such a way that the video head is installed on a lower surface of the rotary drum by engaging a fastening screw therethrough, and is formed with a slot, and a deformable member inserted into the slot in such a way that, when the deformable member is impinged by a laser beam, the head chip mounting portion of the base plate moves by a volume expansion of the deformable member.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Figure 1:
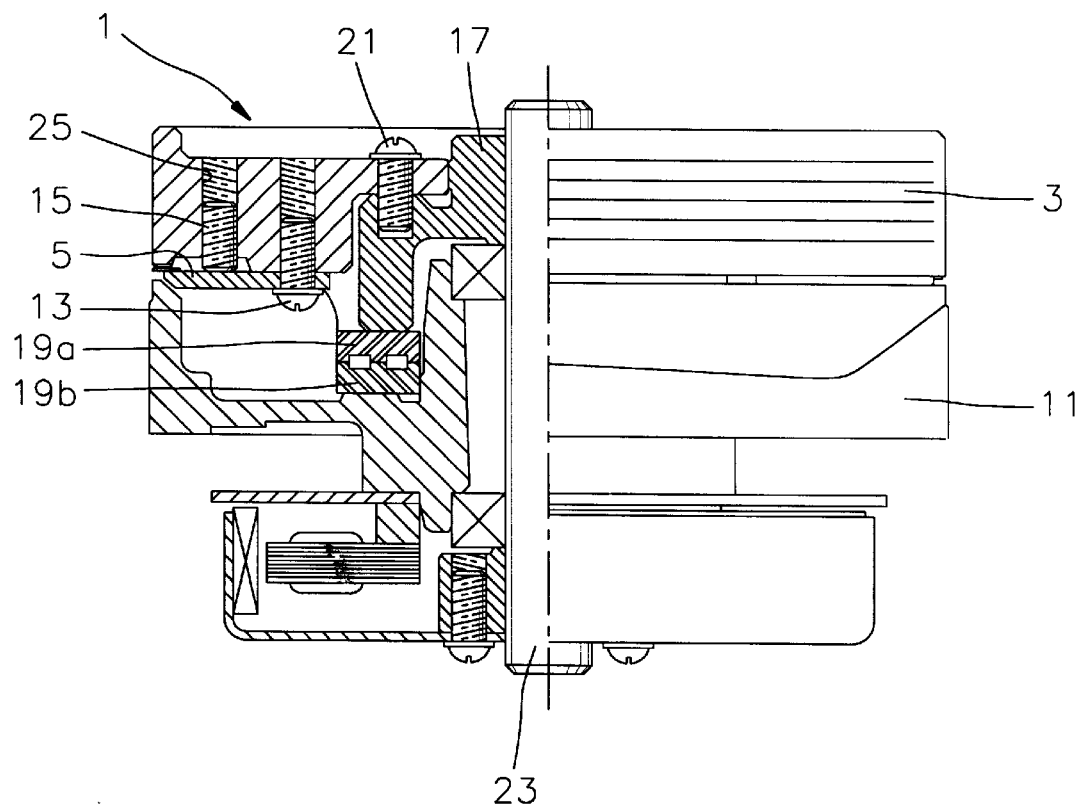
FIG. 1 shows a cross sectional view of a head drum assembly employing a conventional video head.
Figure 2:
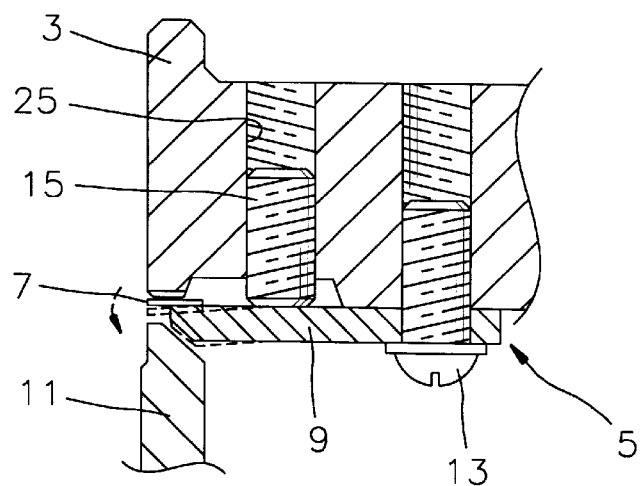
FIG. 2 illustrates a partial cross sectional view showing an engagement of the video head with a rotary drum.
Figure 3:
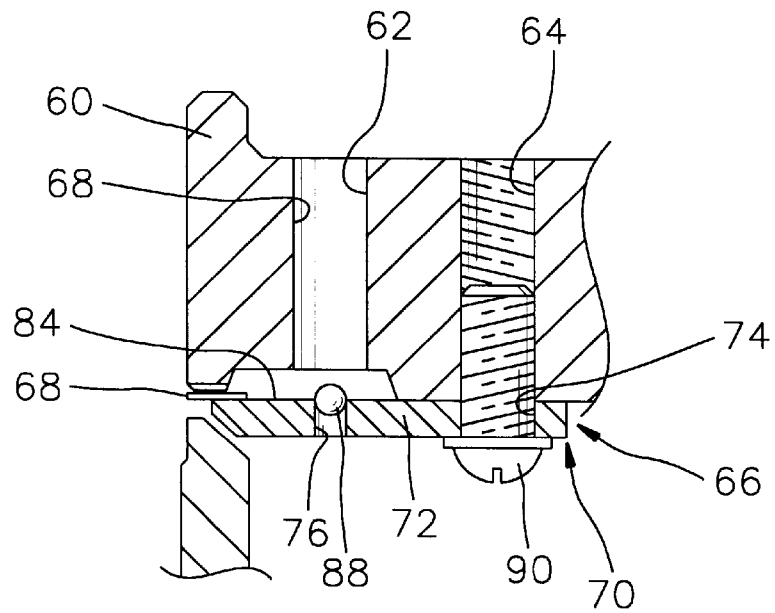
FIG. 3 offers a cross sectional view showing an engagement of a video head with a rotary drum in accordance with the present invention.

Referring to FIG. 3, an inventive head drum assembly includes a rotary drum 60, a video head 66, and a deformable member 88.

The rotary drum 60 is formed with a through hole 62 and a threaded hole 64 which extend from top of the rotary drum 60 to bottom thereof.

The video head 66 is composed of a head chip 68 for recording/reproducing signals on a magnetic tape (not shown), and a base plate 70 divided into a fixed portion 72 and a head chip mounting portion 84 extending from the fixed portion 72. It is preferable that the base plate 70 is made of an elastic material. The fixed portion 72 of the base plate 70 is formed with an aperture 74 corresponding to the threaded hole 62 of the rotary drum 60 and the head chip 68 is mounted on the head chip mounting portion 84 of the base plate 70.

Figure 4:
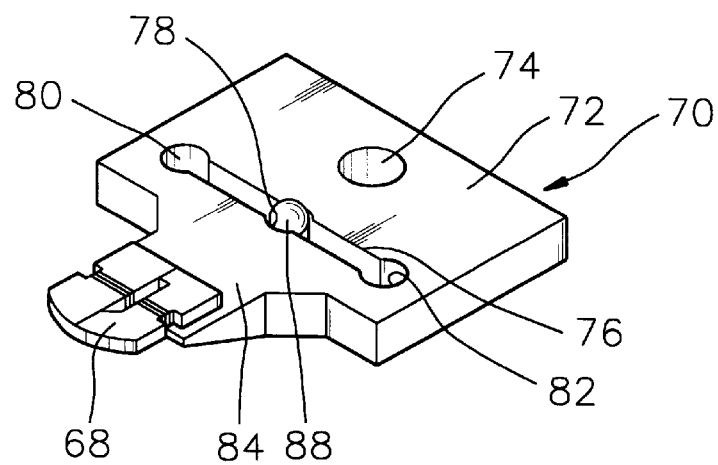
FIG. 4 presents a perspective view of the video head in accordance with the present invention.

Furthermore, as clearly shown in FIG. 4, the fixed portion 72 of the base plate 70 is formed with a slot 76 at a vicinity of a boundary with the head chip mounting portion 84 of the base plate 70. The slot 76 has a first round portion 78 at a location aligned with the through hole 62 of the rotary drum 60 as shown in FIG. 3, and a second and a third round portions 80, 82 at both ends where the slot 76 terminates. The first round portion 78 is used for receiving the deformable member 88, and a second and a third round portions 80, 82 are used for easily moving the head chip 68 mounted at the head chip mounting portion 84 of the base plate 70, when the deformable member 88 is impinged by a laser beam, which will be described later in detail.

The video head 66 is installed on a lower surface of the rotary drum 60 by engaging a fastening means, e.g., a screw 90 in and through the aperture 74 thereof and the threaded hole 64 of the rotary drum 60 in such a way that the head chip 68 protrudes slightly past a side surface of the rotary drum 60.

Figure 5:
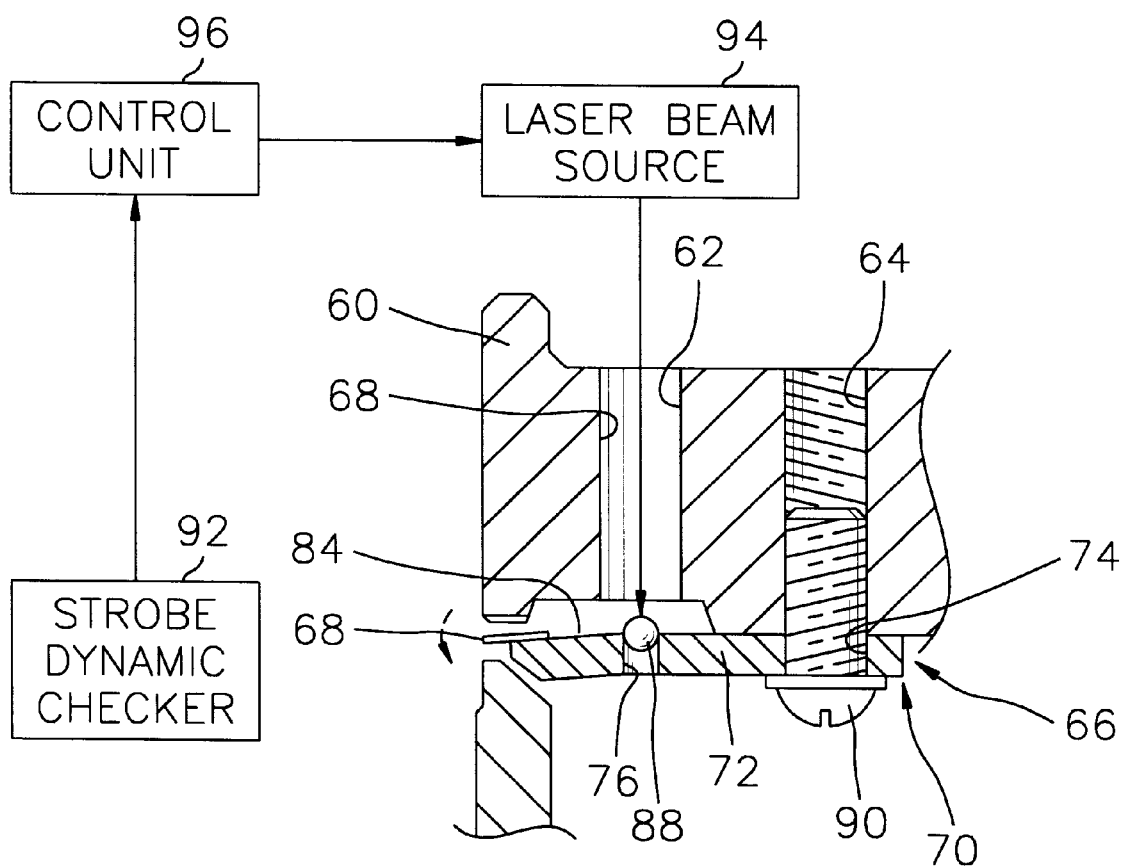
FIG. 5 depicts a cross sectional view setting forth how to adjust a vertical position of a head chip in accordance with the present invention.

The deformable member 88 having a spherical shape is inserted into the first round portion 78 of the slot 76 in such a way that, when the deformable member 88 is impinged by the laser beam, the head chip mounting portion 84 of the base plate 70 moves downwardly by a volume expansion of the deformable member 88. To be more specific, the deformable member 88 is positioned at an upper part of the slot 76 as shown in FIG. 5 so as to move in the direction indicated by an arrow. It is preferable that the deformable member 88 has a larger thermal expansion coefficient than that of the base plate 70.

As shown in FIG. 5, the head drum assembly further includes means for adjusting the vertical position of the head chip 68. The vertical position adjusting means has means for checking the vertical position of the head chip 68, e.g., a strobe dynamic checker 92, a laser beam source 94 for emitting a laser beam, and a control unit 96 for calculating a difference between the data checked by the strobe dynamic checker 92 and a predetermined data relating to the required vertical position of the head chip 68, evaluating this difference and controlling the laser beam source 94.

After the video head 66 is installed on the lower surface of the rotary drum 60, the strobe dynamic checker 92 checks the vertical position of the head chip 68. The checked data is output to the control unit 96. The control unit 96 calculates the difference between the checked data and the predetermined data and evaluates whether the difference is within an allowable limit or not. If the difference between the checked data and the predetermined data is within the allowable limit, the control unit 96 does not turn on the laser beam source 94, but if the difference between the checked data and the predetermined data is not within the allowable limit, the control unit 96 causes the laser beam source 94 to emit the laser beam toward the deformable member 88 through the through hole 62 of the rotary drum 60. The emitted laser beam impinges the deformable member 88 inserted into the first round portion 78 of the slot 76, which, in turn, expands the volume of the deformable member 88. The volume expansion of the deformable member 88 causes the head chip mounting portion 84 of the base plate 70 to downward rotate about deformable member 88. As a result, the head chip 68 mounted on the head chip mounting portion 84 of the base plate 70 moves vertically and changes the vertical position thereof.

The vertical position of the head chip 68 is then rechecked by the strobe dynamic checker 92, and depending on the difference between the checked data and the predetermined data, the above described process is repeated until the head chip 68 is placed at the desired position.

In such a head drum assembly, it is possible to adjust the vertical position of the head chip, precisely and simply.

Although the invention has been shown and described with respect to the preferred embodiments, it will be understood by those skilled in the art that various changes and modifications may be made without departing from the scope of the invention as defined in the following claims.

What is claimed is:

1. A head drum assembly for use in a video cassette recorder, comprises:

a rotary drum having a through hole and a threaded hole which extend from top of the rotary drum to bottom thereof;

a video head composed of a head chip for recording/reproducing signals on a magnetic tape, and a base plate divided into a fixed portion and a mounting portion for mounting the head chip, wherein the fixed portion of the base plate is formed with an aperture corresponding to the threaded hole of the rotary drum in such a way that the video head is installed on a lower surface of the rotary drum by engaging a fastening means therethrough, and is formed with a slot; and a deformable member inserted into the slot in such a way that, when the deformable member is impinged by a laser beam, the head chip mounting portion of the base plate moves by a volume expansion of the deformable member.

2. The head drum assembly of claim 1, wherein the base plate is made of an elastic material.

3. The head drum assembly of claim 1, wherein the slot is formed at the fixed portion of the base plate at a vicinity of a boundary with the mounting portion of the base plate.

4. The head drum assembly of claim 1, wherein the slot has at its center a portion for receiving the deformable member.

5. The head drum assembly of claim 1, wherein the slot has a pair of round portions at both ends where the slot terminates, for easily moving the head chip mounting portion of the base plate, when the deformable member is impinged by a laser beam.

6. The head drum assembly of claim 1, wherein the deformable member has a spherical shape.

7. The head drum assembly of claim 1, wherein the deformable member has a larger thermal expansion coefficient than that of the base plate.

8. The head drum assembly of claim 1, wherein the deformable member is inserted into an upper part of the slot in such a way that, when the deformable member is impinged by a laser beam, the head chip mounting portion of the base plate moves downwardly by a volume expansion of the deformable member.

9. The head drum assembly of claim 1, wherein the fastening means is a screw.

* * * * *